United States Patent [19]

West

[11] Patent Number: 5,932,314

[45] Date of Patent: Aug. 3, 1999

[54] INSULATED DOOR ASSEMBLY WITH LOW THERMAL DEFLECTION

[75] Inventor: Kenneth J. West, Grabill, Ind.

[73] Assignee: Therma-Tru Corporation, Maumee, Ohio

[21] Appl. No.: 08/922,988

[22] Filed: Sep. 2, 1997

[51] Int. Cl.$^6$ .................................. B32B 3/26; B44F 9/02
[52] U.S. Cl. ...................... 428/151; 428/106; 428/315.5; 428/542.2; 52/313; 264/129
[58] Field of Search .............................. 525/170; 52/313; 264/129, 162; 428/315.5, 151, 106, 542.2

[56] References Cited

U.S. PATENT DOCUMENTS

| | | |
|---|---|---|
| 3,969,560 | 7/1976 | Lewis et al. . |
| 4,172,059 | 10/1979 | Atkins . |
| 4,374,215 | 2/1983 | Atkins . |
| 4,491,642 | 1/1985 | Atkins . |
| 4,550,540 | 11/1985 | Thorn . |
| 4,626,570 | 12/1986 | Gardner . |
| 5,166,291 | 11/1992 | Atkins et al. . |
| 5,395,866 | 3/1995 | Ross et al. . |
| 5,443,775 | 8/1995 | Brannon . |
| 5,537,789 | 7/1996 | Minke et al. . |

*Primary Examiner*—Deborah Jones
*Assistant Examiner*—Jason Savage
*Attorney, Agent, or Firm*—Brooks & Kushman P.C.

[57] ABSTRACT

Compression molded pigmented door skins fabricated by compression molding a pigmented, curable, unsaturated polyester sheet molding compound containing a co-curable unsaturated monomer, a low profile additive, and a microvoid-reducing thermoplastic polymer, exhibit uniform stainability while maintaining a low linear thermal coefficient of expansion. Such door skins are suitable for preparing wood grain textured exterior insulated doors which exhibit minimal thermal deflection when exposed to interior/exterior temperature differentials, even at eight foot door heights. The doors may be stained without first applying a seal coat.

45 Claims, No Drawings

INSULATED DOOR ASSEMBLY WITH LOW THERMAL DEFLECTION

TECHNOLOGICAL FIELD

The present invention pertains to insulated door assemblies having compression molded skins which exhibit minimal thermal deflection. More particularly, the subject invention pertains to insulated door assemblies having skins of compression molded, moderately dark colored, fiber-reinforced sheet molding compound which exhibit reduced thermal expansion and contraction, and yet which retain the ability to receive pigmented stains in a uniform manner.

DISCUSSION OF THE RELATED ART

Entry door system containing fiber reinforced compression molded door skins are becoming increasingly popular. An example of the latter is the Classic-Craft™ door available from Therma-Tru Corporation. Such entry door systems contain front and back skins which are generally both prepared from fiber reinforced sheet molding compound which has been compression molded to provide a wood grain pattern on the door skin. These door skins are mounted onto stiles and rails and contain highly efficient thermal insulation between the skins. Examples of such door assemblies may be found in U.S. Pat. Nos. 4,550,540 and 5,537,789. Such door entry systems are much more thermally efficient than solid wood doors or insulated metal doors, as well as being more aesthetically pleasing than the latter.

However, the increased thermal efficiency of such doors is a mixed blessing, often being so effective in reducing thermal transmission from the exterior to the interior that temperature differentials of 55–60° C. may be created between the exterior and interior skins. In such cases, the skin exposed to the higher temperature will expand to a greater degree than the skin exposed to the lower temperature environment. A portion of this expansive force may be resisted by the adhesive which adheres the skin to the frame; by the frame itself; and by the insulating core. However, stresses on these door components increase dramatically as the temperature differential between opposing skins increases. The stresses can be so great as to temporarily warp the door assembly in a phenomenon known in the industry as "thermal deflection". Consumers, as can be imagined, are generally distraught when they observe this behavior. In addition, the warping or bowing which the door experiences may be of such magnitude that contact between the weatherstripping and door assembly may be lost, thus allowing considerable air infiltration and associated thermal loss.

When thermal deflection occurs, discerning consumers find the products unacceptable in insulated entry door assemblies of even typical residential height, for example, those of about 2 m (6 feet) in height. These doors have lock edges termed "lock stiles" of which the section above the lock may be viewed simplistically as a cantilevered beam approximately 1.1 m in length. Attempts to minimize thermal deflection have been centered on structural changes to the door support members. For example, structural modifications on typical residential insulated door assemblies may use laminated beams in the lock edge or lock stile to reduce thermal deflection. However, the use of such laminated beams results in significant increase in raw material cost. Moreover, such efforts have not been entirely satisfactory, and thermal deflection continues to be a design issue in such products.

While thermal deflection has been a considerable problem in entry doors of normal height, when taller doors are used as dictated by recent trends in building products, the problem becomes even more severe. In such taller doors, the lock position remains at a relatively stationary height, i.e., a height convenient for grasping with the hand of the hypothetical "normal" individual. However, the increased height thus requires a considerably longer portion of the door to be located above the lock set. Thus, the combination of increased skin surface area generating greater force, and a longer cantilevered length, results in a magnitude of thermal deflection which is unacceptable for such doors, even those containing laminated beams in the lock stile.

Numerous materials exist which could be substituted for the fiber reinforced sheet molding compound used to make fiber reinforced door skins. Unfortunately, however, the materials of which the door skin is constructed must meet numerous criteria other than merely minimal thermal expansion. For example, the skins must be relatively strong and yet must have appreciable resiliency in order that they may survive the destructive forces generated upon thermal expansion. Further, and more importantly from a commercial aspect, the door skins must be capable of receiving a pigmented stain in a uniform manner, and should also be capable of being economically pigmented to produce a medium dark to dark surface prior to staining and finishing.

For example, early "fiberglass" doors were colored white. The white substrate was visible through the thin films of solid color stains used to achieve an appearance of wood. Discerning customers found the substrate color to be unacceptable. Moreover, at locations of the door experiencing wear, the underlying white surfaces are easily exposed, rendering the door aesthetically displeasing. Since about 1984, most manufacturers have pigmented the molding compounds used to compression mold the skins with dark or medium darkness pigments. Thus, the materials of skin construction must be capable of receiving such pigments and also of receiving a stain coating in a uniform manner. Furthermore, the materials of construction must be relatively economical in order that the door systems may be made available at a reasonable price. For these reasons, fiberglass sheet molding compound, consisting predominately of curable unsaturated polyester resins generally incorporating one or more co-curable unsaturated monomers, continue to be used to manufacture textured, compression molded door skins.

In the preparation of molded articles by the compression molding of unsaturated polyester/co-curable unsaturated monomer compositions, considerable shrinkage results during the molding process due to a volume decrease in the curable ingredients as these react and crosslink. In non-textured articles, the result may be a cured product which no longer has the dimensions of the mold. In textured articles, the decrease in volume may produce articles with insufficient or indistinct texture. Addition of shrink reducing adjuvants have been found to lower the propensity of the curing polymer system to shrink, thus allowing for full definition of textured surfaces. The efficacy of shrinkage control adjuvants may be assessed by visually observing surface texture, or by measuring the dimensions of cured articles and comparing them to mold dimensions. As the dimensional coefficient of thermal expansion is generally not a linear function of temperature, the expansion and contraction of a cured, finished product over the temperature ranges expected of exterior doors cannot be predicted from measurements made based on compression molding temperatures. Furthermore, those skilled in the art of sheet molding compounds have not been concerned with the thermal expansion of cured, finished products per se, only with changes in volume which are the result of curing during the molding process.

Use of sheet molding compound containing low profile additives was disclosed in low linear thermal coefficient expansion moldable materials in Assignee's U.S. Pat. No. 5,537,789. However, the low profile additive was deemed important to minimize shrinkage of the hot and partially cured skin during molding. There is no recognition apparent from the '789 patent that the low profile additive had any effect on either the linear thermal coefficient of expansion itself or the ability of a door made from compression molded sheet molding compound to resist thermal deflection.

It has been discovered that reduction of the thermal expansion of compression molded door skins prepared from unsaturated polyester sheet molding compounds over the temperature extremes expected during normal use can be accomplished through the use of the same so-called "low profile additives" useful in retaining mold texture definition during compression molding. Low profile additives may be defined as relatively polar thermoplastic polymer materials which, when added to sheet molding compositions, encourage the formation of numerous microvoids. Such additives are believed to phase out during cure under compression molding conditions, resulting in a multi-phasic polymer system. The phase-out of the low profile additives may increase the volume of the curing mass, offsetting the volume reduction of the curing and crosslinking unsaturated components. Moreover, the different phases appear to exhibit different degrees of contraction upon cooling. As the compression molded skins cool prior to and after their removal from the mold, the different phases contract at different rates, causing numerous microvoids to be created.

The microvoids have been found to aid significantly in reducing the thermal expansion of the finished door skin. Moreover, the microvoids are believed to assist in the creation and propagation of microcracks under stress, which adds to the resilience of the door skins, facilitating their continued adhesion to the door support components. Nevertheless, the use of low profile additives, while decreasing the thermal expansion exhibited by door skins, does not eliminate the expansion altogether. Moreover, when the same sheet molding compounds are used on taller doors, the thermal deflection which results from high temperature differentials is again unacceptably large.

Increasing the amount of low profile additive is effective in reducing the degree of thermal expansion of door skins over normal use temperatures. However, the increase in the number of microvoids creates a porosity problem in the skin surface which manifests itself by a mottled, uneven appearance of a stained skin. This mottled appearance is aesthetically displeasing, and unacceptable to the consumer. Therefore, merely increasing the amount of low profile additive cannot solve the thermal defection problem, as the increased amount of low profile additive creates other problems.

A second means of reducing thermal expansion during compression molding is through the use of shrinkage control additives. While shrinkage control additives have been used in formulating sheet molding compound for use in manufacture of compression molded door skins, use of such additives has been very limited in terms of composition amounts. Such additives were introduced, as is the case with low profile additives, for minimizing thermal contraction in compression molded materials during cure. It is not known with certainty how shrinkage control additives function. For example, such materials may create a minor volume (quantity) of microvoids, but not nearly the volume associated with the microvoids produced with low profile additives. Moreover, while low profile additives tend to be highly polar polymers, shrinkage control agents tend to be non-polar. For example, common shrinkage control additives are polystyrene, polyethylene, polycaprolactone, and the like, whereas typical low profile additives include polyacrylics such as polymethylmethacrylate, polyvinylacetate, and saturated polyesters having relatively short aliphatic carbon chain lengths.

It would be desirable to provide fiber reinforced insulated door assemblies having fiber-reinforced door skins, preferably textured, and most preferably, wood-grained skins, which can be economically manufactured from sheet molding compound, and yet which exhibit low thermal deflection due to the use of skins having low thermal expansion coefficients. It would further be desirable to provide skins suitable for such door assemblies which are able to be pigmented with medium to dark colored pigments, and which can accept pigmented stains in a uniform manner without the necessity for use of a pre-stain sealer. Such doors have not been heretofore available.

SUMMARY OF THE INVENTION

The present invention pertains to insulated, fiber-reinforced door assemblies, suitable for exterior use, which exhibit minimal thermal deflection, even in doors of greater than normal height. The doors of the present invention contain fiber-reinforced door skins prepared from sheet molding compound which contains a resin system consisting of one or more curable, unsaturated polyester resins, one or more co-curable, unsaturated monomers, a low profile additive, and a microvoid-reducing thermoplastic polymer which is preferably a shrinkage control additive. Surprisingly, the door skins thus produced exhibit not only exceptionally low linear coefficients of expansion, but also are economically pigmentable, and capable of being stained by pigment-bearing stains in a uniform, aesthetically pleasing manner.

DETAILED DESCRIPTION OF THE INVENTION

The fiber-reinforced door assemblies of the present invention include conventional door components such as lock stiles, rails, edges, insulation and the like, and two skins, at least one of which is a pigmented door skin according to the subject invention, this skin prepared from fiber-reinforced sheet molding compound comprising a curable, unsaturated polyester resin, one or more co-curable unsaturated monomers, a pigment, a low profile additive, a microvoid-reducing thermoplastic polymer, preferably of the class known to the art as low shrinkage additives, and fiberglass reinforcement. The sheet molding compound may also comprise fillers, viscosity adjusting agents, dyes, curing catalysts, and other customary ingredients. By the term "a" as used herein with respect to a class of components is meant "one or more". For example, the term "a low profile additive" means that minimally one low profile additive is employed, optionally two or more of such additives. Conventional door components are discussed in U.S. Pat. Nos. 4,550,540 and 5,537,789, which are herein incorporated by reference.

The curable unsaturated polyester resins are well known to those skilled in the art, and are generally prepared in a non-limiting sense, by esterification or transesterification of one or more unsaturated dicarboxylic acids or reactive derivatives thereof with one or more aliphatic or cycloaliphatic diols. Saturated dicarboxylic acids, aromatic dicarboxylic acids, or their reactive derivatives may be used in conjunction with the unsaturated dicarboxylic acid(s) to lower the crosslink density. Modification of polyester resins by reaction with dicyclopentadiene has been found to produce preferred curable polyesters for use in accordance with the present invention. Curable polyesters with moderately high to high crosslink density, i.e., a crosslink density lower than that obtainable from poly(ethylenemaleate) can produce skins with high resilience while maintaining strength characteristics. Curable polyester resins are available commercially, and are disclosed in U.S. Pat. Nos. 3,969,560; 4,172,059; 4,491,642; and 4,626,570, which are herein incorporated by reference.

The co-curable unsaturated monomers are also well known to those skilled in the art, and include, for example, the various alkylacrylates and alkylmethacrylates as well as vinyltoluene α-methylstyrene, p-methylstyrene, and styrene, the latter being preferred. By the term "co-curing" is meant that the monomer contains reactive unsaturation capable of reacting with itself and/or the unsaturated sites of the curable polyester under the curing conditions. Additional co-curable monomers are identified in the above-referenced patents. A preferred curable unsaturated polyester/co-curable unsaturated monomer combination is a dicyclopentadiene-modified glycol maleate polyester and styrene monomer composition available from Alpha/Owens Corning under the product designation E-903.

Low profile additives are well known to those skilled in the sheet molding composition art. Low profile additives are generally relatively polar thermoplastic polymers such as polymethylmethacrylate, polyvinylacetate, various poly(alkyl)acrylate polymers and copolymers, and saturated polyesters, particularly those having a diol component of low molecular weight, such as ethylene glycol or diethylene glycol, i.e., a glycol having 2–4 carbons, optionally interspersed with ether linkages in the hydrocarbon chain. Low profile additives are generally recognized as creating microvoids in the cured product. While the mechanism of microvoid formation is not known with certainty, it is believed that during the cure of the curable polyester and co-curable monomer to form a thermoset structure, a microgel phase is formed from the curing/crosslinking of the unsaturated components which is at least partially incompatible with the low profile additive, which begins to phase-separate. The phase separation causes an increase in volume of the composition which partially or wholly offsets the shrinkage which results from curing of the polyester/co-curable monomer. The curing polyester forms a matrix which at least partially surrounds the low profile additive phase. Upon cooling, the differences in volume contraction between the two phases results in the formation of microvoids. The presence of such microvoids may be observed by microscopic inspection of the surface, and by the porosity which portions of the surface exhibit with respect to absorbance of liquids, which otherwise would be minimal. More than one low profile additive may be used.

The sheet molding compositions also contain a microvoid-reducing thermoplastic polymer. By the term "microvoid-reducing" is meant the reduction of microvoids on at least one surface of the compression molded door skin. The reduction of microvoids may be assessed by comparing the mineral spirits uptake of a compression molded product with an otherwise similar product prepared from a composition which does not contain the microvoid-reducing thermoplastic polymer. A suitable microvoid-reducing thermoplastic polymer is one which causes a measurable reduction in the mineral spirits uptake under such circumstances. A variety of polymers are suitable for use as microvoid-reducing thermoplastic polymers, including polystyrene, polyethylene, copolymers of styrene and acrylonitrile, and aliphatic polyamides formed from longer carbon chain length monomers, and the like. In general, microvoid-reducing thermoplastic polymers tend to be non-polar polymers. Preferred microvoid-reducing thermoplastic polymers belong to the general class of sheet molding compound additives known as low shrinkage additives. More than one microvoid-reducing polymer may be used.

Low shrinkage additives are well known to those skilled in the art, and by contrast to low profile additives, have substantially less effect on microvoid formation. As with low profile additives, phase out during cure creates a multiphasic system. However, upon cooling, microvoid formation does not occur to a substantial extent. Rather the volume expansion which occurs during phase out contributes to maintenance of volume during the molding operation. Unlike low profile additives, low shrinkage additives are non-polar, or of relatively low polarity. Non-limiting examples include polyethylene, polystyrene, polyolefins in general, such as ethylene copolymers with other monomers such as hexene and octene, cyclohexene, and the like, polypropylene and polypropylene copolymers, and saturated polyesters having appreciable methylene chain lengths such as polycaprolactone. Polystyrene and polyethylene are preferred. Toughened polymers such as high impact polystyrene, and various modifications of the above polymers such as high density linear polyethylene, isotactic and atactic polypropylene and the like are suitable. More than one low shrinkage additive may be used.

In choosing a microvoid-reducing thermoplastic polymer in a formulation, the formulator must consider the compatibility of the skin pigments and stain pigments with the microvoid-reducing thermoplastic polymer. For example, when using iron oxide pigments, best performance in stain pigment adhesion occurs when the microvoid-reducing thermoplastic polymer has a relatively high surface energy. For example, with polyolefins in particular, low pigment/microvoid-reducing thermoplastic polymer compatibility occurs with polyolefins having a low surface energy, such as homopolymeric polyethylene. Thus, with polyolefins, a surface energy above 38 mJ/m$^3$, preferably above 40 mJ/m$^3$ is preferred. These surface energies are preferred for non-olefin polymers as well. Acceptable adhesion, 4 or 5B, decreases rapidly as surface energy decreases. The quantity of microvoid-reducing thermoplastic polymer must be reduced accordingly. At a point, the uniformity of staining ceases to be acceptable to the consumer, despite acceptable adhesion. A surface energy below 36 mJ/m$^3$ is generally unacceptable. Blends of polymers having high and low surface energies may be used in certain instances.

Suitable pigments are preferably those which result in a medium to dark pigmented skin, for example skins having an L* value between 66–75 units, preferably 66–71 units, measured in accordance with the 0–100 CIELAB Opponent Color Scale of test method SAE J1545 color analysis at a reflectance of 45° and an observer angle of 2° with D65 illumination. A variety of natural and synthetic pigments, both organic and inorganic are suitable, inorganic pigments generally being preferred from a light stability viewpoint. Suitable pigments are, for example, the various iron oxide pigments and carbon black. Iron oxide pigments are commercially available in colors ranging from black through brown and red to yellow. Mixtures of various pigments, including lighter pigments such as titanium dioxide, may be used to create a variety of light to dark brown and brown-red tones to simulate woods such as cherry, oak, walnut, and mahogany. The pigments are generally supplied to the molding formulation as a pigment grind in a suitable grind vehicle, for example a minor amount of liquid polyester. Pigments are generally employed in amounts of up to 20 weight percent, more preferably 1 weight percent to 15 weight percent, and more preferably about 2 weight percent to 10 weight percent, these weight percentages based on the total weight of all non-fiberglass and non-filler composition components.

The sheet molding composition generally contains a catalyst in an amount effective to cure the sheet molding compound in a reasonable time. Such catalysts are heat activatable, and are well known, including azo compounds such as azobis(isobutyryronitrile) (AIBN), peroxides, hydroperoxides, peroxyesters, peroxyketones, and the like. Such catalysts generally cure the curable polyester by a free radical mechanism, and may be broadly termed free radical polymerization initiators. Catalysts which are effective in the typical compression molding temperature range of 100° C. to 200° C., preferably about 150° C., are preferred.

Plasticizers may be used in the subject compositions where necessary. Preferably, plasticizers used will have a low vapor pressure and/or exhibit suitable solubility in system components such that the plasticizers will be substantially non-fugitive, i.e., will remain in the door skins even when subjected to relatively high temperatures as might be experienced by the exterior of a door exposed to sunlight through a glass storm door. Examples of suitable plasticizers include the various phosphate esters such as tricresylphosphate, low molecular weight polyester oligomers, and the like. Reactive plasticizers, for example, oligomeric saturated polyesters bearing a terminal or pendant site of unsaturation may be used as well.

Viscosity modifiers may also be used. Viscosity modifiers may include a number of ionic and non-ionic surfactants, associative thickeners, high molecular weight polyacrylic acid and polyacrylic acid copolymers, and the like. Such adjuvants are generally used in quantities of less than 5 weight percent, preferably less than 2 weight percent, and most preferably about 1 weight percent or less, these weight percents relative to the resin system component weight. Viscosity modifiers may increase or decrease viscosity as desired, or may introduce thixotropy into the composition.

Fillers are generally used in the subject invention. The amount of filler may range from 0 weight percent (no filler) to substantially in excess of 50% based on the non-fiberglass components. Amounts up to 75 weight percent have been found suitable, for example. Suitable fillers include various metallic oxides, hydroxides, carbonates, and the like. Suitable fillers also include various natural minerals including clays and finely ground limestone.

Fiberglass reinforcement or other fibrous reinforcement is necessary. While carbon fibers are currently too expensive to be commercially viable, such fibers are also well suited to the door skins of the present invention. By the term "fibrous reinforcement" is meant inorganic or organic reinforcing fibers which maintain their integrity at temperatures of at least 200° C. and which are substantially non-soluble and non-swellable in the polyester sheet molding composition. Preferably, glass, carbon, or ceramic fibers or their mixtures are used. The fibers may be chopped (staple) fibers, continuous fibers, or mixtures of chopped and continuous fibers. Glass mat fibers such as are produced by needling or felting continuous fibers and/or staple fibers may be used as well.

By the term "curable resin component" is meant the total of curable unsaturated polyester(s) and co-curable unsaturated monomer(s). By the term "resin system" is meant the total of the curable resin component, low profile additive, and microvoid-reducing thermoplastic polymer. The term "major" as used herein means 50% or more on a weight basis. The term "minor" as used herein means 50% or less on a weight basis.

Having generally described this invention, a further understanding can be obtained by reference to certain specific examples which are provided herein for purposes of illustration only and are not intended to be limiting unless otherwise specified.

Comparative Example 1

A series of test doors are constructed with compression molded, wood-grained skins of curable polyester sheet molding compound, containing 22–25 weight percent E-glass fiberglass reinforcement and polystyrene as a low shrinkage additive. The sheet molding composition is pigmented to produce a dark wood-tone skin. The sheet molding compound, when cured, has a linear coefficient of thermal expansion of about $21.6–23.4 \times 10^{-6}$ mm/mm/°C. Two series of doors are made from similar materials, the first series having a cantilevered length above the lockset of 1120 mm, the second series having a cantilevered length of 1525 mm.

Thermal deflection of the series of doors is measured by inserting each door into an aluminum frame, the door constrained with clamps at four points, the first three simulating the three hinge points, the fourth simulating the lock point. The temperature of the outside surface of the door is increased by exposure to a bank of infrared lamps until a temperature differential of 56° C. is established between the exterior and interior sides of the door, this differential generally being established in a time period of about 2 minutes. Pinpoint dial indicators are placed at several locations. The deflection measured by a dial indicator mounted at the distal end of the longest cantilevered section, i.e., the top lock-side corner, is the "thermal deflection value". Maximum deflection is measured over a 6–10 minute period of infrared exposure. The nominal six foot doors (1.12 m cantilevered length) are found to have a thermal deflection of 6.4–10.2 mm. The normal 8 foot doors (1.525 m cantilevered length) are found to have a thermal deflection of 18–19 mm, i.e., almost one inch (25.4 mm). The thermal deflection values of these doors are marginally acceptable for six foot doors, and unacceptable in the eight foot doors. The door skins have a good color and stain acceptably without undue mottling.

Comparative Example 2

An eight foot door having a cantilevered length above the lockset of 1.525 m is prepared from a darkly pigmented fiber reinforced sheet molding compound as in Comparative Example 1, but with the resin system modified to reduce the linear coefficient of thermal expansion to a value of $10.0 \times 10^{-6}$ mm/mm/°C. The resin system contains an orthophthalic acid-modified poly(propylene maleate) unsaturated polyester, styrene comonomer, and a large amount of polyvinylacetate low profile additive. The door exhibited an acceptable thermal deflection of only 3.3 mm. However, the microvoid density is so great that the pigmented skin color appears whitened by 10 L* units to a medium wood-tone color having an L* value of 71. Although this color tone may be acceptable to the consumer, it is less darkly pigmented than desired based on the pigment loading. A darker door would require a higher amount of relatively expensive pigment. More importantly, the door skins exhibit a noticeable mottled appearance when stained, which is aesthetically unacceptable. Application of a seal coat prior to staining substantially eliminates or minimizes mottling. However, use of a separate seal coat during finishing by the consumer is commercially unacceptable.

The above comparative examples indicate that decreasing the linear coefficient of expansion of the door skins significantly decreases the thermal deflection exhibited by doors having these door skins mounted thereon. The linear coefficient of thermal expansion (LCTE) of door skins in accordance with the subject invention should be less than $17.8 \times 10^{-6}$ mm/mm/°C., and preferably in the range of $0-13 \times 10^{-6}$ mm/mm/°C. However, these examples further indicate that merely decreasing the LCTE by adding additional low profile additive results in a door with unacceptable aesthetics: a door with less than the desired color saturation, and one which presents a mottled appearance upon staining. Both these effects are believed due to the presence of the large amount of microvoids produced by the large amount of low profile additive required.

The ability of a compression molded door skin surface to accept stain has been found to correlate with the uptake of mineral spirits by the door skin material. A suitable test method consists of preparing 60 mm×25 mm×3 mm plaques of compression molded skin. The molded sample is weighed, then immersed for 60 seconds in mineral spirits. The sample is removed and the outside surfaces hand wiped with a laboratory towel to remove excess mineral spirits. The sample is weighed after 5 minutes. The increase in weight reflects the mineral spirit uptake. When expressed in weight percent, it has been found that "mineral spirit uptake" of less than 0.15%, and preferably in the range 0–0.05% provides a surface which can be stained uniformly with consumer acceptable aesthetics. Mineral spirit uptake of 0.15% and higher produce stained surfaces of mottled appearance which are unacceptable to the consumer. The mottled nature of such surfaces may be easily discerned, without visual aids, by the casual observer.

It has now been surprisingly discovered that the concurrent use of both a low profile additive and a microvoid-reducing thermoplastic polymer, preferably a low shrinkage additive, in fiber-reinforced sheet molding compound compositions enable the manufacture of doors having minimal thermal deflection while at the same time providing for good color tone and surface characteristics which allow for uniform staining. The door skins are economical in their use of pigment, and do not require a pre-stain sealing step. In a preferred embodiment, the skins are prepared in a mold having a temperature differential of preferably at least 3° C. between the mold surface which abuts the internal face of the door skin and the mold surface which abuts the external skin face. By the term "external" is meant the door skin surface which will be exposed in the door assembly.

The resin system of the present invention comprises a curable unsaturated polyester resin co-curable monomer admixture in an amount of from about 40–80%, preferably 50–70%; a low profile additive in an amount of from about 15–40%, preferably 15–35%, and more preferably 20–30%; and a microvoid-reducing thermoplastic polymer, preferably a low shrinkage additive in an amount of from about 5–30%, preferably 10–25%, and most preferably about 10–20%, all these percents being percents by weight relative to the total resin system of the above-identified ingredients. The amounts of curable unsaturated polyester and co-curable unsaturated monomer are within the conventional ranges for sheet molding compounds.

In addition to the resin system, the sheet molding compound also preferably contains, in parts per 100 parts resin system, from 1 to about 20 parts pigment, preferably 2 to 10 parts, and most preferably 3 to 8 parts; from 0 to 5 parts, preferably 0 to 2 parts, and most preferably about 1 part viscosity adjuster; from 0.01 to 5 parts, preferably 0.1 to 2 parts, and more preferably 0.5 to 2 parts cure catalyst; 0.01 to 5 parts, preferably 0.1 to 2 parts, and more preferably 0.5 to 2 parts of cure catalyst inhibitor to impede room temperature cure, thus prolonging shelf life of the uncured sheet molding compound; 0–250 parts, preferably 30–250 parts, and more preferably 100–200 parts, most preferably about 150–190 parts mineral filler; a pigment grinding vehicle, supplied along with pigment, and present in the composition in amounts of from 0.1 to 10 parts, preferably 0.5 to 5 parts, and most preferably 0.5 to 2 parts; and optionally other customary ingredients. Fibrous reinforcement is present, preferably as chopped E-glass fibers having nominal 25 mm length, in amounts of 65 parts to 300 parts, preferably 70–200 parts, and most preferably 75–110 parts.

The sheet molding compositions are prepared by standard preparation techniques. Low profile additives, microvoid-reducing thermoplastic, and other ingredients where desired, may be dissolved in co-curable unsaturated monomer, e.g., styrene and added in this fashion. In general, the non-fiberglass components are well blended, for example, in high shear, single shaft mixer, a rotating horizontal shaft plow blade mixer, a double planetary mixer, the latter being preferred, or the like, following which the glass fibers are added. The composition is pumped or otherwise processed onto a release film, fiber reinforcement is applied over the initial layer, and a second sheet molding composition applied over the fiberglass reinforcing layer. The layered composition is compressed or worked with rollers to a degree sufficient to wet out the fiber reinforcement and produce a unitary, fiber-reinforced sheet molding compound. Details of the preparation of such products is well known to the skilled artisan. The present invention is not limited to sheet molding compound produced by the above process, but applies generally to sheet molding compound suitable for manufacture of compression molded door skins, and containing unsaturated polyester, co-curable unsaturated monomer, low profile additive, and microvoid-reducing additive, regardless of the actual method of preparation. The finished product is optionally covered with an additional release film or foil.

To prepare a fiber reinforced, pigmented door skin, a suitable mold, preferably a male/female mold having a wood grain pattern with undercuts on the mold surface which will form the external skin surface ("exterior surface" or "textured surface"), as described in U.S. Pat. No. 5,537,789, is heated to about 150° C., sheet molding compound inserted, and the mold closed under pressure (200 psig to 1500 psig generally, preferably 800–1200 psig) for a period of about 2 minutes. A cured or partially cured door skin is then removed. In the case of partially cured skins, an oven post cure may be required.

During the molding process, without wishing to be bound to any particular theory, it is believed that during the various phase-outs which occur during crosslinking/curing of the curable polyester/co-curable monomer, the low profile additive forms a phase separate from that of the microvoid-reducing polymer or low shrinkage additive. The microvoid-reducing polymer or low shrinkage additive phase migrates to the skin surface. Upon cooling, the low profile additive generates microvoids, as expected. However, the low shrinkage additive-rich zone near the surface prohibits or substantially minimizes surface microvoids. As a result of the diminished number of microvoids at the surface, uniform stainability is achieved. At the same time, the combination of lack of surface microvoids, together with what is believed to be greater compatibility of the pigment with the low profile additive, enhances the color saturation, making more efficient use of pigment loading.

The present inventor has further discovered that by compression molding the door skins in a press wherein the temperature of the mold surface abutting the external surface of the skin ("textured mold surface") is maintained at a temperature higher than the temperature of the mold adjacent the internal skin surface, the stainability of the textured skin is markedly improved. This effect is believed due to a preferential migration of low shrinkage additive toward the warmer side of the mold. The temperature differential is preferably at least 3° C., more preferably about 3° C. to 20° C., and most preferably in the range of 3° C. to 10° C.

Example 1 and Comparative Example 3

Two otherwise identical 8 foot doors were prepared, using, in Comparative Example 3, the resin system of Comparative Example 1, and using, for Example 1, a sheet molding composition containing the following ingredients:

| INGREDIENT | PARTS BY WEIGHT |
|---|---|
| Curable polyester/co-curable monomer[1] | 60 |
| Low profile additive[2] | 25 |
| Shrinkage control agent[3] | 15 |
| Iron/oxide/titanium dioxide pigment[4] | 6 |
| Grinding vehicle adjuvant[5] | 1 |
| Mold release adjuvant[6] | 4 |
| Viscosity adjusting adjuvant[7] | 1 |
| Mineral filler adjuvant[8] | 180 |
| Cure catalyst[9] | 1 |
| Inhibitor[10] | 0.3 |
| Chopped (23 mm) E-glass fiber | 94 |
| Thickener[11] | 1 |

[1]Alpha/Owens-Corning E-903-1, DCPD-modified glycol maleate polyester and styrene
[2]Alpha Owens-Corning E-4300-1, diethylene glycol adipate polyester dissolved in styrene
[3]Alpha/Owens-Corning P-714, polystyrene dissolved in styrene
[4]Plasticolor CM-44784
[5]Ashland MR 1208A
[6]Norac Coad 10
[7]Vinyltoulene
[8]Huber 10-4
[9]t-butylperbenzoate
[10]Ashland Mod - E
[11]Plasticolor PG-9033

Conventional molding techniques were employed, with a nominal mold temperature of 150° C., the textured (wood grained) surface of the mold maintained at a 3–10° C. higher temperature than the other mold surfaces. Molding pressure was 1000 psig.

Properties of doors prepared from the inventive and comparative door skins were found to be as follows:

| PROPERTY | EXAMPLE 1 DOOR/SKIN | COMPARATIVE EXAMPLE C3 DOOR/SKIN |
|---|---|---|
| Skin Flexural Strength | 102 MPa | 94 MPa |
| Skin Flexural Modulus | 13.1 GPa | 12.4 GPa |
| Skin Tensile Strength | 34 MPa | 38 MPa |
| Skin Density | 1814 kg/m$^3$ | 1835 kg/m$^3$ |
| Skin Gardner Impact, First Crack | 6.9 kg force*cm | 6.9 kg force*cm |
| Skin Color Lightness (CIELAB) | 74 L* units | 71 L* units |
| Skin CLTE | 13.9 × 10$^{-6}$ mm/mm/° C. | 13.9 × 10$^{-6}$ mm/mm/° C. |
| Mineral Spirit Uptake | 0.065 weight % | 0.429 weight % |
| Door Assembly Thermal Deflection at 55° C. | 4.3 mm | 5.0 mm |
| Differential Stain Characteristics | Uniform Staining | Mottled |

As can be seen, although the comparative example produced a door having similar thermal deflection to the inventive example, the stain characteristics were poor, presenting a mottled appearance.

Having now fully described the invention, it will be apparent to one of ordinary skill in the art that many changes and modifications can be made thereto without departing from the spirit or scope of the invention as set forth herein.

What is claimed is:

1. In an insulated door assembly having at least one pigmented fiber-reinforced compression molded door skin, the improvement comprising selecting as said door skin:
   a pigmented door skin prepared from a compression molded, fiber-reinforced sheet molding compound, said sheet molding compound comprising
   a) a resin system comprising
      i) a curable unsaturated polyester resin and a co-curable unsaturated monomer in an amount of from about 40% to about 80%;
      ii) a microvoid-producing low profile additive composition in an amount of from about 20% to about 40%, said composition comprising a microvoid-producing low profile additive supplied in solution in a co-curable unsaturated monomer;
      iii) a microvoid-reducing thermoplastic polymer composition in an amount of from about 5% to about 30%, said composition comprising a microvoid-reducing thermoplastic polymer supplied in solution in a co-curable unsaturated monomer, the percentages of a)i, a)ii, and a)iii being in weight percent based on the sum of a)i, a)ii, and a)iii;
   b) at least one pigment; and
   c) fibrous reinforcement;
   said sheet molding compound curable to provide a door skin being uniformly stainable on an exterior textured surface thereof, having a linear coefficient of thermal expansion of less than about 17.8×10$^{-6}$ mm/mm/°C. and a mineral spirits uptake of less than 0.15 weight percent, said insulated door assembly exhibiting a thermal deflection value of less than about 6.4 mm when the distance between a lock set position and the top of a lock stile exceeds 1 m, wherein said microvoid-reducing thermoplastic polymer a)iii) is different from said low profile additive a)ii).

2. The door assembly of claim 1 wherein said curable polyester comprises a dicyclopentadiene-modified glycolmaleate polyester.

3. The door assembly of claim 1 wherein said polyester comprises a glycolmaleate polyester containing aromatic dicarboxylic acid residues.

4. The door assembly of claim 1 wherein the major portion of said co-curable monomer is selected from the group consisting of styrene, α-methylstyrene, p-methylstyrene, vinyltoluene, and mixtures thereof.

5. The door assembly of claim 1 wherein said microvoid-reducing thermoplastic polymer comprises a low shrinkage additive.

6. The door assembly of claim 5 wherein at least a portion of said microvoid-reducing thermoplastic polymer is selected from the group consisting of polystyrene, polyolefins, polycaprolactone, and mixtures thereof.

7. The door assembly of claim 6 wherein said microvoid-reducing thermoplastic polymer is a polyolefin polymer or copolymer prepared from one or more monomers selected from the group consisting of ethylene, $C_3$–$C_{10}$ 1-olefins, and cyclolefins, said polyolefin having a surface energy in excess of about 38 $mJ/m^3$.

8. The door assembly of claim 1 wherein at least a portion of said low profile additive is a thermoplastic low profile additive selected from the group consisting of poymethylmethacrylate, polyvinylacetate, saturated aliphatic polyesters, and mixtures thereof.

9. The door assembly of claim 1 wherein said low profile additive comprises poly(diethylene-glycoladipate).

10. The door assembly of claim 1 wherein said at least one skin has a lightness L* of 66–75 units when viewed at a reflectance of 45° and an observer angle of 2° with a D65 illuminant in accordance with SAE J1545.

11. The door assembly of claim 1 wherein said at least one skin is prepared from a sheet molding compound comprising
a) a resin system comprising
i) a curable unsaturated polyester resin and a co-curable unsaturated monomer in an amount of from about 50% to about 70%;
ii) a microvoid-producing low profile additive composition in an amount of from about 15% to about 35%;
iii) a microvoid-reducing thermoplastic polymer composition in an amount of from about 10% to about 25%, the percentages of a)i, a)ii, and a)iii being in weight percent based on the sum of a)i), a)ii), and a)iii);
b) fiberglass reinforcement; and
c) at least one pigment;
wherein said curable unsaturated polyester comprises a cyclopentadiene-modified glycol maleate polyester; said co-curable monomer comprises styrene; said low profile additive is a thermoplastic low profile additive selected from the group consisting of polymethylmethacrylate, polyvinylacetate, a saturated $C_2$–$C_4$ glycoladipate polyester, and mixtures thereof; wherein said microvoid-reducing thermoplastic polymer is selected from the group consisting of polystyrene, polyethylene, poly(ethylene/1-hexene), poly(ethylene/1-octene), polypropylene; and mixtures thereof; said microvoid-reducing thermoplastic polymer having a surface energy greater than about 38 $mJ/m^3$;
wherein said door skin is uniformly stainable on an exterior, textured surface thereof, exhibits a linear coefficient of thermal expansion of less than about 17.8×10⁻⁶ mm/mm/°C., and a mineral spirits uptake of less than 0.15 weight percent; and wherein said door assembly exhibits a thermal deflection value of less than about 6.4 mm when the distance between a lock set position and the top of a lock stile is greater than 1 m.

12. The door assembly of claim 1 wherein the exterior surface of said at least one skin contains fewer microvoids than a comparative skin prepared from the same resin system but devoid of said microvoid-reducing thermoplastic polymer additive.

13. The door assembly of claim 1 wherein the concentration of said microvoid-reducing thermoplastic polymer additive is higher at the exterior surface of said skin than the interior of said skin.

14. A method for the manufacture of a pigmented door skin having at least one exterior textured surface which is uniformly stainable, said door skin having a linear coefficient of thermal expansion of less than 17.8×10⁻⁶ mm/mm/°C. and a mineral spirits uptake of less than about 0.15 weight percent, said method comprising
compression molding a fiber-reinforced sheet molding compound in a two part mold at an elevated temperature, said two part mold having a first mold surface which abuts one surface of said skin, and a second mold surface which abuts an exterior surface of said skin during compression molding, said fiber-reinforced sheet molding compound comprising
a) a resin system comprising
i) a curable unsaturated polyester resin and a co-curable unsaturated monomer in an amount of from about 40% to about 80%;
ii) a microvoid-producing low profile additive composition in an amount of from about 20% to about 40%, said composition comprising a microvoid-producing low profile additive supplied in solution in a co-curable unsaturated monomer;
iii) a microvoid-reducing thermoplastic polymer composition in an amount of from about 5% to about 30%, said composition comprising a microvoid-reducing thermoplastic polymer supplied in solution in a co-curable unsaturated monomer, the percentages of a)i, a)ii, and a)iii being in weight percent based on the sum of a)i, a)ii, and a)iii;
b) at least one pigment; and
c) fibrous reinforcement;
said sheet molding compound curable to provide a door skin being uniformly stainable on said exterior surface thereof, having a linear coefficient of thermal expansion of less than about 17.8×10⁻⁶ mm/mm/°C. and a mineral spirits uptake of less than 0.15 weight percent, said insulated door assembly exhibiting a thermal deflection value of less than about 6.4 mm when the distance between a lock set position and the top of a lock stile exceeds 1 m, wherein said microvoid-reducing thermoplastic polymer a)iii) is different from said low profile additive a)ii).

15. The method of claim 14 wherein said curable polyester comprises a dicyclopentadiene-modified glycolmaleate polyester.

16. The method of claim 15 wherein said unsaturated polyester comprises a glycolmaleate polyester further containing aromatic dicarboxylic acid residues.

17. The method of claim 14 wherein the major portion of said co-curable monomer is selected from the group consisting of styrene, α-methylstyrene, p-methylstyrene, vinyltoluene, and mixtures thereof.

18. The method of claim 14 wherein said low profile additive is selected from the group consisting of polymethylmethacrylate, polyvinylacetate, saturated aliphatic polyesters, and mixtures thereof.

19. The method of claim 18 wherein at least a portion of said microvoid-reducing thermoplastic polymer is selected from the group consisting of polystyrene, polyolefin, polycaprolactone, and mixtures thereof.

20. The method of claim 19 wherein said polyolefin is a polyolefin polymer or copolymer prepared from one or more monomers selected from the group consisting of ethylene, $C_3$–$C_{10}$ 1-olefins, and cycloolefins, said polyolefin having a surface energy greater than about 38 $mJ/m^3$.

21. The method of claim 18 wherein the exterior surface of said at least one skin contains fewer microvoids than a comparative skin prepared from the same resin system but devoid of said low shrinkage additive.

22. The method of claim 18 wherein the concentration of said microvoid-reducing thermoplastic polymer is higher at the exterior surface of said skin than the interior of said skin.

23. The method of claim 14 wherein said low profile additive comprises poly(diethylene-glycoladipate).

24. The method of claim 14 wherein said at least one skin has a lightness L* of 66–75 units when viewed at a reflectance of 45° and an observer angle of 2° with a D65 illuminant in accordance with SAE J1545.

25. The method of claim 14 wherein said at least one skin is prepared from a sheet molding compound comprising
   a) a resin system comprising
      i) a curable unsaturated polyester resin and a co-curable unsaturated monomer in an amount of from about 50% to about 70%;
      ii) a low profile additive composition in an amount of from about 15% to about 35%;
      iii) a microvoid-reducing thermoplastic polymer composition in an amount of from about 10% to about 25%, the percentages of a)i, a)ii, and a)iii being in weight percent based on the sum of a)i), a)ii), and a)iii) wherein said microvoid-reducing thermoplastic polymer composition has a surface energy in excess of 38 $mJ/m^3$;
   b) fiberglass reinforcement; and
   c) at least one pigment;
wherein said curable unsaturated polyester comprises a cyclopentadiene-modified glycol maleate polyester; said co-curable monomer comprises styrene; said low profile additive is a thermoplastic low profile additive selected from the group consisting of polymethylmethacrylate, polyvinylacetate, a saturated $C_2$–$C_4$ glycoladipate polyester, and mixtures thereof; wherein said microvoid-reducing thermoplastic polymer comprises a low shrinkage additive selected from the group consisting of polystyrene, polyethylene, poly(ethylene/1-hexene), poly(ethylene/1-octene), polypropylene; and mixtures thereof;
wherein said door skin is uniformly stainable on an exterior, textured surface thereof, exhibits a linear coefficient of thermal expansion of less than about $17.8 \times 10^{-6}$ mm/mm/°C. and a mineral spirits uptake of less than 0.15 weight percent; and wherein said door assembly exhibits a thermal deflection value of less than about 6.4 mm when the distance between a lock set position and the top of a lock stile is greater than 1 m.

26. The method of claim 14, wherein said second mold surface of said mold has a temperature higher than said first mold surface.

27. The method of claim 26 wherein the difference in temperature between said first mold surface and said second mold surface is between about 3° C. and 10° C.

28. A method for increasing the uniformity of staining of a pigmented, fiber-reinforced compression molded door skin having at least one exterior surface and an interior surface, and prepared from a fibrous reinforcement-containing sheet molding compound having a resin system comprising a curable unsaturated polyester, a co-curable unsaturated monomer, and in excess of 10 weight percent of a low profile additive, said skin having a linear coefficient of thermal expansion less than $17.8 \times 10^{-6}$ mm/mm/°C., said method comprising:
   selecting as said low profile additive a microvoid-producing low profile additive, and adding to said resin system a microvoid-reducing effective amount of a thermoplastic polymer which preferentially migrates to said at least one exterior surface during cure at elevated temperature, thereby causing a reduction in the areal concentration of microvoids at said surface, said reduction evidenced by a reduced mineral spirits uptake when compared to the mineral spirits uptake of a comparative door skin prepared from the same sheet molding composition but devoid of said microvoid-reducing thermoplastic polymer, wherein said microvoid-reducing thermoplastic polymer is different from said low profile additive.

29. The method of claim 28 wherein the mineral spirits uptake of said pigmented door skin is less than about 0.15 weight percent.

30. The method of claim 28 wherein said microvoid-reducing thermoplastic polymer comprises a low shrinkage additive.

31. The method of claim 30 wherein said low shrinkage additive is selected from the group consisting of polystyrene, polyolefins, and polycaprolactone.

32. The method of claim 28 wherein said microvoid-reducing thermoplastic polymer composition is present in an amount from about 10 weight percent to about 25 weight percent based on the total weight of said curable unsaturated polyester, said co-curable unsaturated monomer, said low profile additive composition, and said microvoid-reducing thermoplastic polymer composition.

33. The method of claim 28, wherein said elevated temperature is between 100° C. and 200° C.

34. The method of claim 33, further comprising molding said fibrous reinforcement-containing sheet molding compound to form a door skin, wherein said exterior surface of said door skin is molded at a temperature which is higher than said interior surface of said door skin by about 3° C. to 10° C. during compression molding of said door skin.

35. The method of claim 34 wherein the concentration of thermoplastic polymer is higher in the exterior portion of said skin than the interior of said skin.

36. The method of claim 28 wherein the concentration of microvoid-reducing thermoplastic polymer is higher in the exterior portion of said skin than the interior of said skin.

37. A compression molded door skin, comprising the elevated temperature compression molded product of a compression moldable resin system comprising
   a) a resin system comprising
      i) a curable unsaturated polyester resin and a co-curable unsaturated monomer in an amount of from about 40% to about 80%;
      ii) a microvoid-producing low profile additive composition in an amount of from about 15% to about 40%, said composition comprising a microvoid-producing alkylene glycol-derived saturated polyester low profile additive supplied in solution in a co-curable unsaturated monomer;
      iii) a microvoid-reducing thermoplastic polymer composition in an amount of from about 5% to about 30%, said composition comprising a polystyrene, polyolefin, acrylonitrile/styrene copolymer, aliphatic polyamide, or mixture thereof as a microvoid-reducing thermoplastic polymer supplied in solution in a co-curable unsaturated monomer, the percentages of a)i, a)ii, and a)iii being in weight percent based on the sum of a)i, a)ii, and a)iii;

b) at least one pigment; and c) fibrous reinforcement;

said sheet molding compound curable to provide a door skin being uniformly stainable on an exterior textured surface thereof, having a linear coefficient of thermal expansion of less than about $17.8 \times 10^{-6}$ mm/mm/°C. and a mineral spirits uptake of less than 0.15 weight percent, said insulated door assembly exhibiting a thermal deflection value of less than about 6.4 mm when the distance between a lock set position and the top of a lock stile exceeds 1 m, wherein said microvoid-reducing thermoplastic polymer a)iii) is different from said low profile additive a)ii).

38. The door skin of claim 37, wherein said microvoid-reducing thermoplastic polymer comprises polystyrene.

39. The door skin of claim 37, wherein said curable unsaturated polyester comprises a dicyclopentadiene-modified polyester.

40. In a compression molded door skin prepared by elevated temperature compression molding of a compression moldable resin system comprising an unsaturated polyester resin and co-curable unsaturated monomer, fibrous reinforcement, optionally a low shrinkage additive, and a low profile additive which causes microvoid formation in said door skin upon curing, the improvement comprising adding to said compression moldable resin system from about 5% to about 30% by weight, based on the sum of the weights of unsaturated polyester, co-curable monomer, low profile additive, and microvoid reducing thermoplastic composition, of a microvoid-reducing thermoplastic polymer composition comprising a microvoid-reducing thermoplastic polymer supplied in solution in a co-curable unsaturated monomer, wherein the concentration of microvoids is reduced as compared to a door skin prepared from the same composition but devoid of the microvoid-reducing thermoplastic.

41. The door skin of claim 40, wherein said microvoid-forming low profile additive comprises a saturated aliphatic polyester.

42. The door skin of claim 40, wherein said microvoid-reducing thermoplastic is selected from the group consisting of polystyrene, polyethylene, copolymers of acrylonitrile and styrene, and aliphatic polyamides.

43. The door skin of claim 40 wherein said microvoid-reducing thermoplastic comprises polystyrene.

44. The door skin of claim 40 wherein said microvoid-reducing thermoplastic comprises polyolefin.

45. The door skin of claim 40 wherein said microvoid-reducing thermoplastic polymer is selected from the group consisting of polyethylene, polypropylene, polypropylene copolymers, copolymers of ethylene and hexene, copolymers of ethylene and octene, copolymers of ethylene and cycloolefins, and mixtures thereof.

* * * * *